United States Patent [19]
Hilgeman et al.

[11] Patent Number: 6,035,629
[45] Date of Patent: Mar. 14, 2000

[54] SYSTEM FOR CONTROLLING ACCELERATION OF A LOAD COUPLED TO A GAS TURBINE ENGINE

[75] Inventors: Paul E. Hilgeman, Santee; Kenneth W. Winston; Ronald I. Vicente, both of San Diego, all of Calif.

[73] Assignee: Hamilton Sunstrand Corporation, Rockford, Ill.

[21] Appl. No.: 08/907,587

[22] Filed: Aug. 8, 1997

[51] Int. Cl.[7] ......................................... F02C 7/36
[52] U.S. Cl. ............................. 60/39.2; 60/39.24
[58] Field of Search ................. 60/39.03, 39.2, 60/39.24, 39.282; 74/DIG. 5

[56] References Cited

U.S. PATENT DOCUMENTS

| | | |
|---|---|---|
| 3,093,010 | 6/1963 | Spreitzer et al. ............ 60/39.2 |
| 3,367,106 | 2/1968 | Robinson .................... 60/39.2 |
| 3,826,218 | 7/1974 | Hiersig et al. ............... 115/34 |
| 4,263,997 | 4/1981 | Poore . |
| 4,337,615 | 7/1982 | LaCroix . |
| 4,356,900 | 11/1982 | Summer . |
| 4,432,201 | 2/1984 | Hawes . |
| 4,532,763 | 8/1985 | Pisano . |
| 5,004,084 | 4/1991 | Mehr-Ayin et al. . |
| 5,272,637 | 12/1993 | Urushidani et al. . |
| 5,440,490 | 8/1995 | Summerfield . |
| 5,495,715 | 3/1996 | Loxley . |
| 5,609,016 | 3/1997 | Yamada et al. . |

FOREIGN PATENT DOCUMENTS 3527012  2/1987  Germany .

*Primary Examiner*—Louis J. Casaregola
*Attorney, Agent, or Firm*—Marshall O'Toole Gerstein Murray & Borun

[57] ABSTRACT

A system and method of controlling the acceleration of a load driven by a gas turbine engine detects the existence of an overload condition and reduces an acceleration setpoint when such condition arises.

9 Claims, 4 Drawing Sheets

SYSTEM FOR CONTROLLING ACCELERATION OF A LOAD COUPLED TO A GAS TURBINE ENGINE

TECHNICAL FIELD

The present invention generally relates to gas turbine engines, and more particularly to a system and method of controlling a driven load using such an engine.

BACKGROUND ART

Gas turbine engines are often used to drive hydraulic or other loads, typically through a controllable clutch. At times, the gas turbine engine may experience an overload condition in excess of its performance limits. When such a condition arises, the gas turbine engine is unable to accelerate the driven load to the desired speed. In addition, if proper safety limits are not in place, this overload condition can also result in severe damage to the clutch.

Engine speed and acceleration in gas turbine engines are often controlled by controlling the rate of fuel flow supplied to the engine. For example, U.S. Pat. No. 4,432,201 to Hawes describes an acceleration/deceleration limiter circuit that maintains an acceleration limit for a closed loop fuel control of a gas turbine engine. If engine acceleration exceeds the acceleration limit, the closed loop control regulates the fuel flow to cause engine deceleration. To control engine acceleration during transient conditions in such a manner as to prevent engine stall, the system is also equipped with an acceleration limit reset circuit that changes the acceleration limit to accommodate the transient operating conditions. Similarly, U.S. Pat. No. 4,532,763 to Pisano describes an engine acceleration control system that effects precise control of fuel flow to control engine acceleration. A closed loop control system with feedback monitors various engine operating parameters to determine the operating acceleration of the engine and to determine therefrom the proper rate of fuel flow. The system is capable of performing acceleration control during normal operating conditions as well as transient operating conditions.

Further, U.S. Pat. No. 4,337,615 to LaCroix describes a gas turbine fuel control system that controls engine acceleration by varying the fuel flow to the engine to maintain an engine at an engine reference speed set point.

Although these prior art systems effectively control gas turbine engine acceleration, they do not control the driven load acceleration.

SUMMARY OF THE INVENTION

In accordance with the present invention, a system for controlling the acceleration of a driven load using a gas turbine engine provides protection in the event of an overload condition.

According to one aspect of the present invention, a control system for a gas turbine engine includes a controllable clutch mechanism that couples a rotor of the gas turbine engine to the load to control the acceleration of the load, a sensor that senses an overload condition, and a clutch control device responsive to the sensor for controlling the clutch mechanism to change the acceleration of the load. Preferably, the clutch mechanism is a hydraulically actuated clutch, and the clutch control device controls the pressure of oil supplied to the hydraulically actuated clutch as a function of fuel flow magnitude. Also preferably, the sensor is a fuel flow sensor and the clutch control device reduces an acceleration setpoint as a function of an engine parameter, such as fuel flow magnitude.

According to another aspect of the present invention, an overload protection system is coupled to a gas turbine engine having a rotor and a combustor. The overload protection system includes a controllable clutch mechanism that couples the rotor to an output shaft which drives a load. Preferably, the clutch mechanism is operable in a non-overload condition to maintain the load acceleration at a first level. A control includes a sensor that senses fuel flow provided to the combustor and means responsive to the sensor to cause the clutch mechanism to change the load acceleration to a second level less than the first level in the event of an overload condition.

According to a still further aspect of the present invention, a method of controlling the acceleration of a driven load using a gas turbine engine having a rotor for driving the load includes the steps of controlling acceleration of the driven load with a controllable clutch mechanism, sensing an overload condition and operating the clutch mechanism to cause engine deceleration in response to the overload condition.

The acceleration control system and method of the present invention protects a gas turbine engine and the clutch mechanism that couples the engine to a load against the damaging effects of an overload condition by limiting load acceleration, thereby keeping the engine within the performance limits thereof.

DESCRIPTION OF THE PREFERRED EMBODIMENTS

Figure 1:
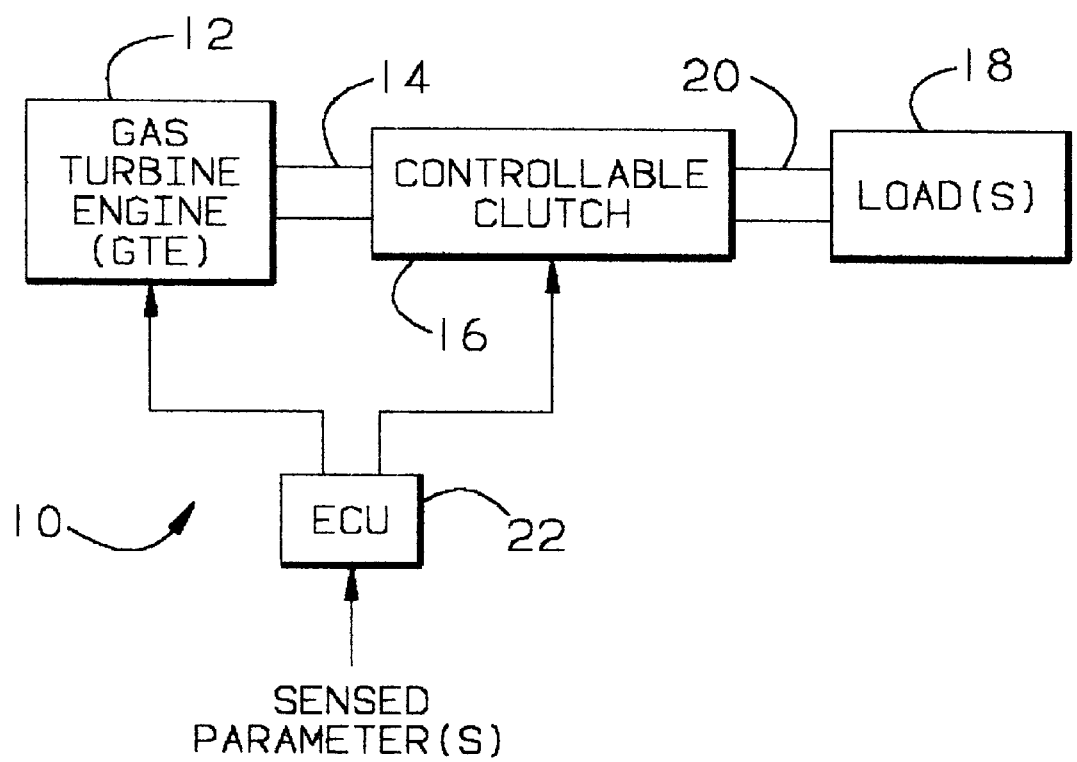
FIG. 1 comprises a block diagram of a system including a gas turbine engine, a clutch, a load and an engine control unit (ECU)

Referring now to FIG. 1, a gas turbine engine system 10 which may be used in, for example, an aircraft, includes a gas turbine engine (GTE) 12 having a motive power rotor shaft 14 coupled to a conventional controllable clutch 16. The controllable clutch 16 is, in turn, coupled to one or more loads 18 via a clutch output shaft 20. An engine control unit 22 is responsive to one or more sensed parameters to control fuel flow to the GTE 12 and further controls the clutch 16. Preferably, the clutch 16 is hydraulically (i.e., oil) actuated and hydraulic control pressure delivered to the clutch 16 is controlled by the ECU 22. If desired, the clutch 16 may be of a different type, provided that the clutch is operable by the ECU 22 to control the acceleration of the load(s) 18.

Figure 2:
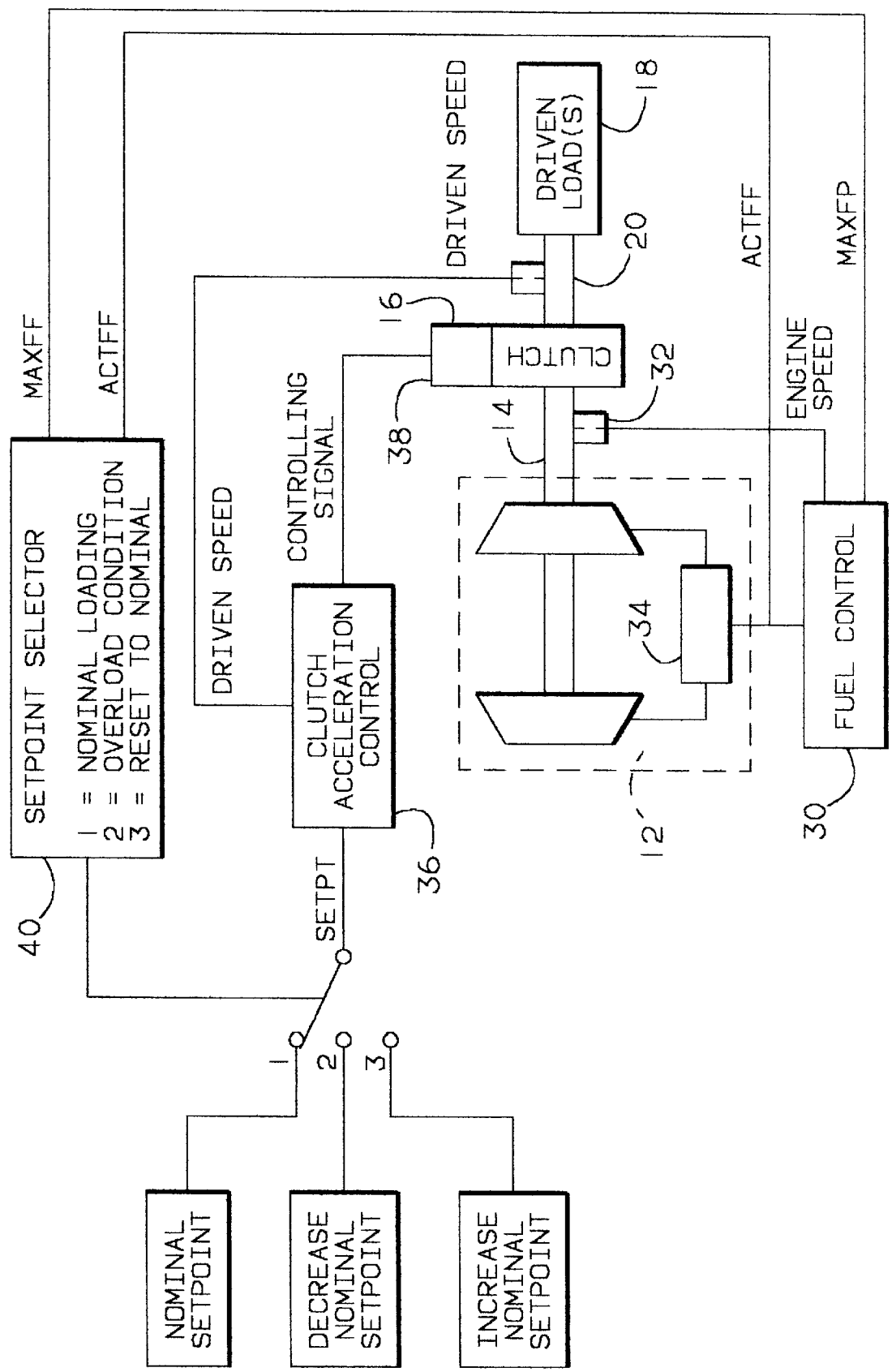
FIG. 2 comprises a more specific block diagram of the system of claim 1.

FIG. 2 is a block diagram illustrating the operation of the system of FIG. 1. The ECU 22 includes a fuel control module 30 which is operable in response to a signal representing actual engine speed as detected by a speed sensor 32 to control fuel delivery to a combustor 34 of the GTE 12. The fuel control module 30 further develops a signal MAXFF representing a maximum limit of fuel flow magnitude. The magnitude of the signal MAXFF may vary in accordance with a maximum fuel schedule which is a function of ambient temperature and altitude and is utilized to prevent the GTE 12 from exceeding operating limits.

The ECU 22 further includes a clutch acceleration control module 36 which is responsive to the speed of rotation of the clutch output shaft 20 and a setpoint signal SETPT representing a desired or commanded load acceleration. The clutch acceleration control module provides a control signal to a clutch control unit 38, which in turn varies hydraulic control pressure to the clutch 16 to cause load acceleration to approach the commanded level.

The signal SETPT is developed by a setpoint selection module 40 which is described in greater detail in connection with FIGS. 3a and 3b. The setpoint selection module 40 is responsive to a signal ACTFF representing actual fuel flow and the signal MAXFF representing the maximum fuel limit and develops a value of SETPT based upon a determination that an overload condition is presently occurring or that the system is recovering from an overload condition. Generally, when fuel flow approaches the maximum limit represented by MAXFF, a determination is made that an overload condition has arisen and the ECU 22 reduces the load demand on the GTE 12 by preferably gradually decreasing the value of SETPT. This gradual decrease is preferred as opposed to a step change to limit the transient response of the system. Subsequently, when recovery from the overload condition occurs, the value of SETPT is preferably gradually increased so that the load(s) 18 can be accelerated to the desired speed.

Figure 3A:
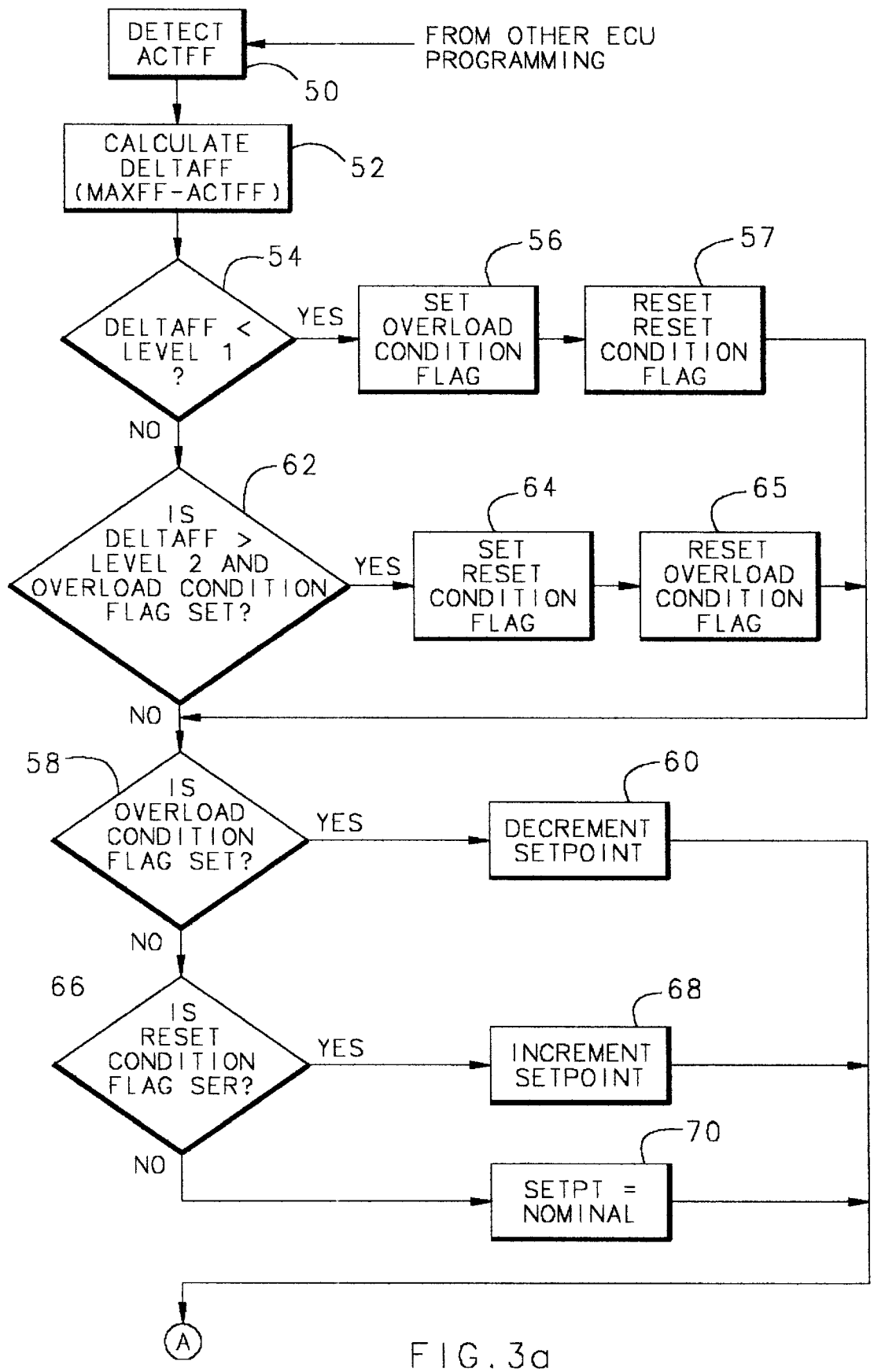
FIGS. 3a and 3b, when joined along similarly-lettered lines, together comprise a flowchart of programming executed by the ECU of FIG. 1 to implement the present invention.
Figure 3B:
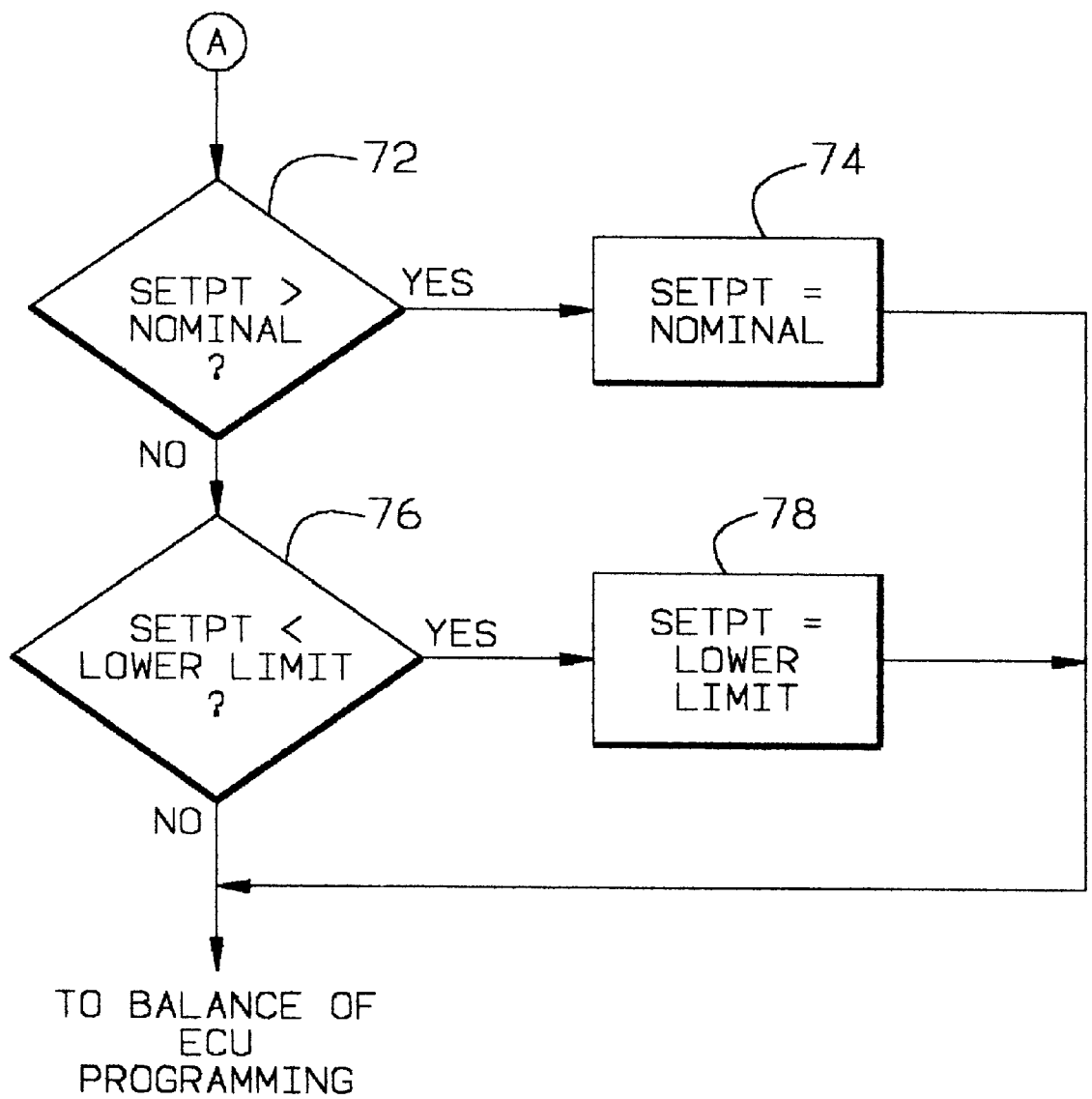

Referring now to FIGS. 3a and 3b, the ECU 22 is preferably implemented by a processor or programmable controller which executes programming to control load acceleration, as well as to undertake the remaining ECU functions. If desired, the ECU 22 may alternatively be implemented in a different fashion, such as by discrete logic components, firmware or any other components. The programming represented by the flowchart of FIGS. 3a and 3b forms only a part of the total ECU programming, which is repetitively executed during each of a series of execution cycles. The programming begins at a block 50, which detects the current value of ACTFF representing the actual fuel flow magnitude. A block 52 then calculates a value DELTAFF equal to the difference between the values MAXFF and ACTFF. The value DELTAFF represents the amount by which the actual fuel flow magnitude differs from the current maximum fuel flow limit, as established by the maximum fuel schedule. A block 54 then checks the value of DELTAFF to determine whether it is less than a value LEVEL1. If DELTAFF is less than LEVEL1, then the actual fuel flow magnitude is sufficiently close to the maximum fuel limit to conclude that an overload condition has arisen and control passes to a block 56 which sets an overload condition flag or otherwise develops an indication that the overload condition is present. A block 57 then resets a flag (called a reset condition flag) indicating that the system is not currently in a reset condition. Thereafter, control passes to a block 58 which checks the status of the overload condition flag. If the overload condition flag is set, control passes to a block 60, which decrements the value of acceleration setpoint SETPT by a certain amount. In a specific example, the value of SETPT may be decremented by 1% of rotational speed per second. It should be noted that the decrement value of the block 60 is preferably empirically determined to optimize an operating condition, for example, to minimize losses in the clutch 16. Further, by adding suitable programming, the decrement value of the block 60 may vary from execution cycle to execution cycle, if necessary or desirable. Following the block 60, control proceeds to a set of control blocks shown in FIG. 3b (described hereinafter) that limit the value of the acceleration setpoint.

If the block 54 determines that DELTAFF is not less than LEVEL1, then a block 62 checks to determine (1) whether DELTAFF is greater than a value LEVEL2 and (2) whether the overload condition flag is set (i.e., whether an overload condition exists). If both conditions are found to exist, then control passes to a block 64 that sets the reset condition flag or otherwise develops an indication that the system is in a reset condition. Control then proceeds to a block 65 which causes the overload condition flag to be reset. It should be noted in connection with the blocks 56, 57, 64 and 65 that the overload condition flag and reset condition flag may be linked such that setting the reset condition flag automatically causes the overload condition flag to be reset and vice versa. After the reset condition flag is set and the overload condition flag is reset, the block 58, as described earlier, checks to determine whether the overload condition flag is set. If the system is not in an overload condition, control passes to a block 66 which checks to determine whether the reset condition flag is set. If so, control passes to a block 68 which increments the value of SETPT by a constant amount per execution cycle or by an amount which varies from one execution cycle to the next. This value again is preferably empirically determined to optimize an operating condition, such as to minimize clutch losses. If the reset condition flag is not set and the overload condition flag is not set, a block 70 adjusts SETPT to a nominal setpoint value NOMINAL. Note that this condition in which neither the overload condition flag nor the reset condition flag are set only occurs prior to the first overload condition; thereafter, control will not proceed to the block 70 from the block 66.

Following the blocks 60, 68 and 70, control passes to a block 72, FIG. 3b, which checks to determine whether the value of SETPT is greater than NOMINAL. If SETPT is greater than NOMINAL, a block 74 adjusts SETPT to NOMINAL. Thereafter, control proceeds to the remainder of the ECU programming.

If, the block 72 determines that SETPT is not greater than NOMINAL, a block 76 checks to determine whether SETPT is less than a minimum acceleration setpoint value LOWER LEVEL. If SETPT is less than LOWER LEVEL, a block 78 adjusts SETPT to be equal to LOWER LEVEL. If SETPT is not less than LOWER LEVEL, control proceeds to the remainder of the ECU programming. The value LOWER LEVEL may be empirically determined and represents the minimum acceptable acceleration setpoint level.

Because the programming of FIGS. 3a and 3b is repetitively executed during a sequence of execution cycles, the net effect of the programming is to reduce the acceleration setpoint SETPT when an overload condition is detected until the point at which DELTAFF exceeds LEVEL2, whereupon SETPT is thereafter gradually increased. In addition, a SETPT limiter control, implemented by the blocks of FIG. 3b, limits the value of SETPT to be less than or equal to the nominal value NOMINAL and greater than the minimum acceptable value LOWER LEVEL. If, in the alternative, an overload condition has not yet occurred and, therefore, a reset condition has not yet occurred, then the programming will maintain SETPT at the nominal value NOMINAL.

Numerous modifications and alternative embodiments of the present invention will be apparent to those skilled in the art in view of the foregoing description. Accordingly, this description is to be construed as illustrative only and is for the purpose teaching those skilled in the art the best mode of carrying out the invention. The details of the structure and/or function may be varied substantially without departing from the spirit of the invention, and the exclusive use of all modifications which come within the scope of the appended claims is reserved.

We claim:

1. A control for a system including a gas turbine engine having a rotor for driving a load and a controllable clutch mechanism for coupling the rotor to the load, comprising:

means for sensing an overload condition; and means responsive to the sensing means for causing the clutch mechanism to change the acceleration of the load without disengaging the clutch.

2. The control of claim 1, wherein the clutch mechanism is a hydraulically actuated clutch, and wherein the causing means includes means for controlling oil supply pressure to the hydraulically actuated clutch as a function of fuel flow magnitude.

3. The control of claim 1, wherein the sensing means comprises a fuel flow sensor.

4. The control of claim 1, wherein the causing means comprises means for reducing an acceleration setpoint.

5. The control of claim 1, wherein the causing means comprises means for reducing an acceleration setpoint as a function of an engine parameter.

6. The control of claim 5, wherein the engine parameter comprises fuel flow.

7. An overload protection system for a gas turbine engine wherein the gas turbine engine includes a rotor and a combustor, comprising:

a controllable clutch mechanism for coupling the rotor of the gas turbine engine to an output shaft that drives a load wherein the controllable clutch mechanism is operable under a non-overload condition to maintain the load acceleration at a first level; and a control including means for sensing fuel flow to the combustor and means responsive to the sensing means for causing the clutch mechanism to change the load acceleration to a second level less than the first level in the event of an overload condition.

8. The overload protection system of claim 7, wherein the clutch mechanism is a hydraulically actuated clutch and wherein the causing means includes means for controlling oil supply pressure to the hydraulically actuated clutch as a function of fuel flow magnitude.

9. The overload protection system of claim 7, wherein the control includes further means causing the clutch mechanism to return the load acceleration to the first level upon termination of the overload condition.

* * * * *